US 9,473,457 B2

(12) United States Patent
Koved et al.

(10) Patent No.: US 9,473,457 B2
(45) Date of Patent: Oct. 18, 2016

(54) INTERACTIVE MANAGEMENT OF WEB APPLICATION FIREWALL RULES

(75) Inventors: Lawrence Koved, Pleasantville, NY (US); Lin Luo, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1256 days.

(21) Appl. No.: 12/603,947

(22) Filed: Oct. 22, 2009

(65) Prior Publication Data

US 2011/0099482 A1   Apr. 28, 2011

(51) Int. Cl.
*G06F 3/00* (2006.01)
*H04L 29/06* (2006.01)
*G06F 21/60* (2013.01)
*H04L 29/08* (2006.01)

(52) U.S. Cl.
CPC ......... *H04L 63/0263* (2013.01); *G06F 21/604* (2013.01); *H04L 67/02* (2013.01); *G06F 2221/2117* (2013.01)

(58) Field of Classification Search
None
See application file for complete search history.

(56) References Cited

U.S. PATENT DOCUMENTS

| | | |
|---|---|---|
| 6,850,974 B2 | 2/2005 | Schweitzer et al. |
| 2003/0212900 A1 | 11/2003 | Liu et al. |
| 2004/0128545 A1 | 7/2004 | Chakravarty |
| 2005/0268335 A1 | 12/2005 | Le et al. |
| 2006/0041637 A1 | 2/2006 | Jerrard-Dunne |
| 2006/0059462 A1* | 3/2006 | Yamamoto .................... 717/115 |
| 2006/0129587 A1 | 6/2006 | Renfro et al. |
| 2006/0253420 A1 | 11/2006 | Hinton et al. |
| 2006/0294194 A1* | 12/2006 | Graveline et al. ............ 709/217 |
| 2007/0143852 A1* | 6/2007 | Keanini et al. ................. 726/25 |
| 2007/0162968 A1 | 7/2007 | Ferreira et al. |
| 2008/0168392 A1* | 7/2008 | Brooks et al. ................ 715/810 |
| 2008/0195952 A1* | 8/2008 | Ewing et al. ................. 715/735 |
| 2008/0201643 A1* | 8/2008 | Nagaitis et al. .............. 715/738 |
| 2010/0094878 A1* | 4/2010 | Soroca et al. ................ 707/748 |

OTHER PUBLICATIONS

"Method for a Software Firewall Emulator Application," IPCOMM00146688D; published Feb. 19, 2007.

* cited by examiner

*Primary Examiner* — Anil N Kumar
(74) *Attorney, Agent, or Firm* — Fleit Gibbons Gutman Bongini Bianco; Jose Gutman (57) ABSTRACT

A computer implemented method, information processing system, and computer program product manage web application firewall rule configuration. A web application is analyzed. A set of data elements within the web application is identified. Each data element in the set of data elements stores information that is sent from a web client to a web server. Each data element in the set of data elements is analyzed. A data type is associated with each data element in the set of data element. The data type describes a type of data stored by the data element. A web application firewall rule recommendation is automatically generated for each data element based at least on the data type associated therewith.

8 Claims, 6 Drawing Sheets

| | DISPLAY | PARAMETER ID | TYPE | PATTERN | RECOMMENDATION |
|---|---|---|---|---|---|
| 118 | NAME | PUBLIC_NAME_FULL | CHARACTER STR. | RULE A | RULE A (306) |
| | FIRST | PUBLIC_NAME_FIRST | CHARACTER STR. | | RULE N |
| | LAST | PUBLIC_NAME_LAST | CHARACTER STR. | RULE Y | RULE N |
| | . . . . . | | | | |
| | AGE | AGE | INT | | RULE X |
| NON-VISUAL DATA ELEMENTS | | | | | |
| | NON-VISUAL | ELEMENT | TYPE | PATTERN | RECOMMENDATION |
| | NON VIS. 1 | NON VIS_EL_1 | FLOATING POINT INT | | RULE Q |
| | NON VIS. N | NON VIS_EL_N | CHARACTER STR. | | RULE W |

INTERACTIVE MANAGEMENT OF WEB APPLICATION FIREWALL RULES

FIELD OF THE INVENTION

The present invention generally relates to web applications, and more particularly relates to managing firewall rules for web applications.

BACKGROUND OF THE INVENTION

A web application firewall (WAF) is generally hardware and/or software that resides between a web client and a web server. A web application firewall applies a set of rules to hypertext transfer protocol (HTTP) conversations. Generally, the rules applied by the WAF aim to prevent common attacks such as cross site scripting (XSS) and structured query language (SQL) injection. These rules can be customized for specific web applications to identify and block attacks thereon, or to define specifically which input should follow certain criteria and otherwise to block the input. However, the effort to perform this customization can be significant, and maintaining this customization can also be significant especially when the web application is modified.

For example, some conventional WAFs that are located within a web server perform web content filtering based on rules that are described as regular expressions. Creating and maintaining the rules can be time consuming (i.e., expensive), especially if the rule writer must guess the names and allowable values of each of the fields in each page/field of the web application.

SUMMARY OF THE INVENTION

In one embodiment, a computer implemented method manages web application firewall rule configuration. The computer implemented method comprises analyzing a web application. A set of data elements within the web application is identified based on the analyzing. Each data element in the set of data elements stores information that is sent from a web client to a web server. Each data element in the set of data elements is analyzed based on the identifying. A data type is associated with each data element in the set of data element based on the analyzing. The data type describes a type of data stored by the data element. A web application firewall rule recommendation is automatically generated for each data element based at least on the data type associated therewith.

In another embodiment, an information processing system manages web application firewall rule configuration. The information processing system comprises a memory and a processor that is communicatively coupled to the memory. A user interface is communicatively coupled to the memory and the processor. A web application firewall manager is communicatively coupled to the memory, the processor, and the user interface. The web application firewall manager analyzes a web application. A set of data elements within the web application is identified based on the analyzing. Each data element in the set of data elements stores information that is sent from a web client to a web server. Each data element in the set of data elements is analyzed based on the identifying. A data type is associated with each data element in the set of data elements based on the analyzing. The data type describes a type of data stored by the data element. A web application firewall rule recommendation is automatically generated for each data element based at least on the data type associated therewith. The web application firewall rule recommendation is displayed to a user in the user interface based on automatically generating the web application firewall rule recommendation.

In yet another embodiment a computer program product manages web application firewall rule configuration. The computer program product comprises a computer readable storage medium having computer readable program code embodied therewith. The computer readable program code comprises computer readable program code configured to perform in the following manner. At least a portion of a web application is displayed in a user interface. The web application is analyzed. A set of data elements within the web application is identified based on the analyzing. Each data element in the set of data elements stores information that is sent from a web client to a web server. Each data element in the set of data elements is analyzed based on the identifying. A data type is associated with each data element in the set of data element based on the analyzing. The data type describes a type of data stored by the data element. A web application firewall rule recommendation is automatically generated for each data element based at least on the data type associated therewith. The web application firewall rule recommendation is displayed to a user in the user interface based on automatically generating the web application firewall rule recommendation.

In another embodiment, a graphical user interface for managing web application firewall rule configuration is disclosed. The graphical user interface comprises at least a first area that displays at least a portion of a web application to a user. At least a second area interactively displays information associated with the web application for managing a set of web application firewall rules for the web application. The second area displays at least a data type for each data element in a set of data elements of the web application. The first area dynamically alters a visual appearance of a data element of the web application that is displayed in the first area when the data element is selected by a user. The second area dynamically alters a visual appearance of at least the data type displayed therein that is associated with the data element that has been selected by the user.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. Plural and singular terms are the same unless expressly stated otherwise.

Operating Environment

Figure 1:
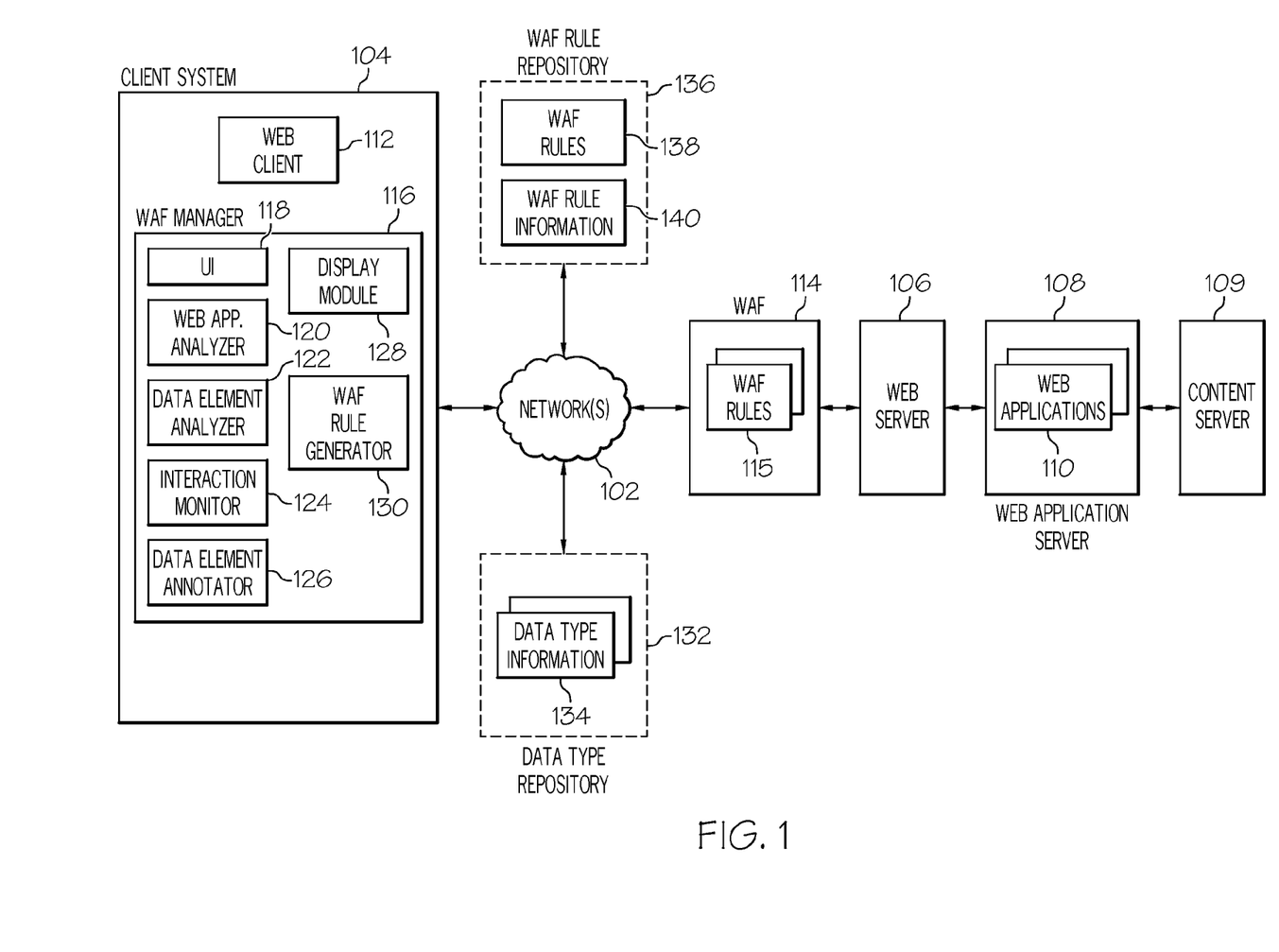
FIG. 1 is a block diagram illustrating one example of an operating environment according to one embodiment of the present invention.

According to one embodiment, FIG. 1 illustrates one example of an operating environment/system 100 for interactively managing WAF rules. FIG. 1 shows one or more networks 102 that, in one embodiment, are wide area networks, local area networks, wired networks, wireless networks, and the like. In one embodiment, one or more client information processing systems 104 are communicatively coupled to the network(s) 102. The one or more networks 102 communicatively couple the client system(s) 104 to one or more web servers 106. The web server(s) 106 is communicatively coupled to one or more web application servers 108. The web application server(s) 108 is communicatively coupled to one or more content servers or databases 109. The web application server(s) 108 comprise one or more web applications 110. A web application 110, in one embodiment, is a computer program that allows users at the client system 104 to send and receive data to/from one or more of the databases 109 using a web client 112 such as a web browser.

The web application server 108, in one embodiment, can be configured to serve web pages 202 to the client system 104 over the network 102. The web application server 108, in turn, can support the execution of server side logic such that the web pages 202 and server side logic can combine to present a web application(s) 110 including a web interface on the client system 104. For example, the web application 110 dynamically generates information to be displayed to a user in a given format such as the Hypertext Markup Language (HTML) format. This information is then presented to the user at the client system 104 via the web application server 108.

The web applications 110, in one embodiment, comprise one or more web pages 202. A web page 202 of a web application 110 can include text composed in any combinations of at least three types of languages: a visual presentation language, a script language, and a data modeling language. The visual presentation language is used to provide a graphic user interface (GUI) in the web client 112. The visual presentation language can be used to visually present the text or linked objects (such as a voice or a graphic file), to receive user input, and transfer data to and from a remote host through the web client 112. The script language provides a way to embed logic that creates dynamic visual displays or conducts immediate computations when its web page 202 is processed. The data modeling language is used to describe certain data in web applications such that their structures and definitions of data elements inside them can be easily applied by other applications that understand the same language and uses the same definitions for data elements. Therefore, specialized code is not needed to decode data received from other applications.

The environment 100 also includes one or more web application firewalls (WAF) 114 comprising a set of WAF rules 115 situated between the client system 104 and the web application server 108. The WAF 114 analyzes Open Systems Interconnection (OSI) layer 7 messages to ensure security policies are being enforced/followed unlike standard firewalls that only prevent access to given ports or services. Therefore, the WAF 114 protects the web application server 108 from unauthorized access and abuse.

As discussed above, the rules applied by the WAF 114 that prevent common attacks on the web application server 108 need to be customized for given web applications. However, the effort to perform this customization can be significant. Therefore, in one embodiment, the client system 104 comprises a web application firewall manager 116 that allows a user to easily and efficiently interact with the WAF 114 to configure the WAF rules 115. In one embodiment, the WAF manager 116 comprises a user interface (UI) 118, a web application analyzer 120, a data element analyzer 122, an interaction monitor 124, a data element annotator 126, a display module 128, and a firewall rule generator 130. The WAF manager 116 and each of its components are discussed in more detail below. The environment 100 also comprises an optional data type repository 132 that comprises data type information 134. The environment 100 also comprises an optional WAF rule repository 136 that comprises WAF rules 138 and WAF rule information 140. The data type repository 132, the WAF rule repository 136, and their components are discussed in greater detail below.

Interactive Management of WAF Rules

Conventional web application firewall products generally include a tree-view user interface for configuring the WAF rules one by one. This tree-view usually only lists the Universal Resource Identifier (URI), parameters, and the to-be configured security patterns for each application request and does not provide the user information/hints about which application page this request is generated from. Also, the parameter names, in many instances, are just non-descriptive, e.g. "element001". This makes configuring the WAF rules a very difficult process for the user.

However, various embodiments of the present invention provide an interactive method of configuring one or more firewall rules via the WAF manager 116. As will be discussed below, the configuration user interface 118, in one embodiment, is based on the actual web application page that generates the request that is to be associated with a WAF rule, rather than a list of request URIs. The WAF manager 116 provides the user with an application browsing experience and allows the user to select various WAF rules while browsing a given web application page with the help of the application context. For example, various embodiments identify the correlation between the parameters in a rule configuration window of the UI 118 and the descriptive names in a main application window of the UI 118. One or more embodiments can then dynamically indicate this correlation to the user by, for example, visually altering a data field(s) and its related descriptive name(s) or other WAF configuration information to indicate a correlation. This allows for the user to visually see and interact with the web application 110 within a browser window and manage the WAF rules 115 for each the web application components while interacting with the application 110.

Figure 2:
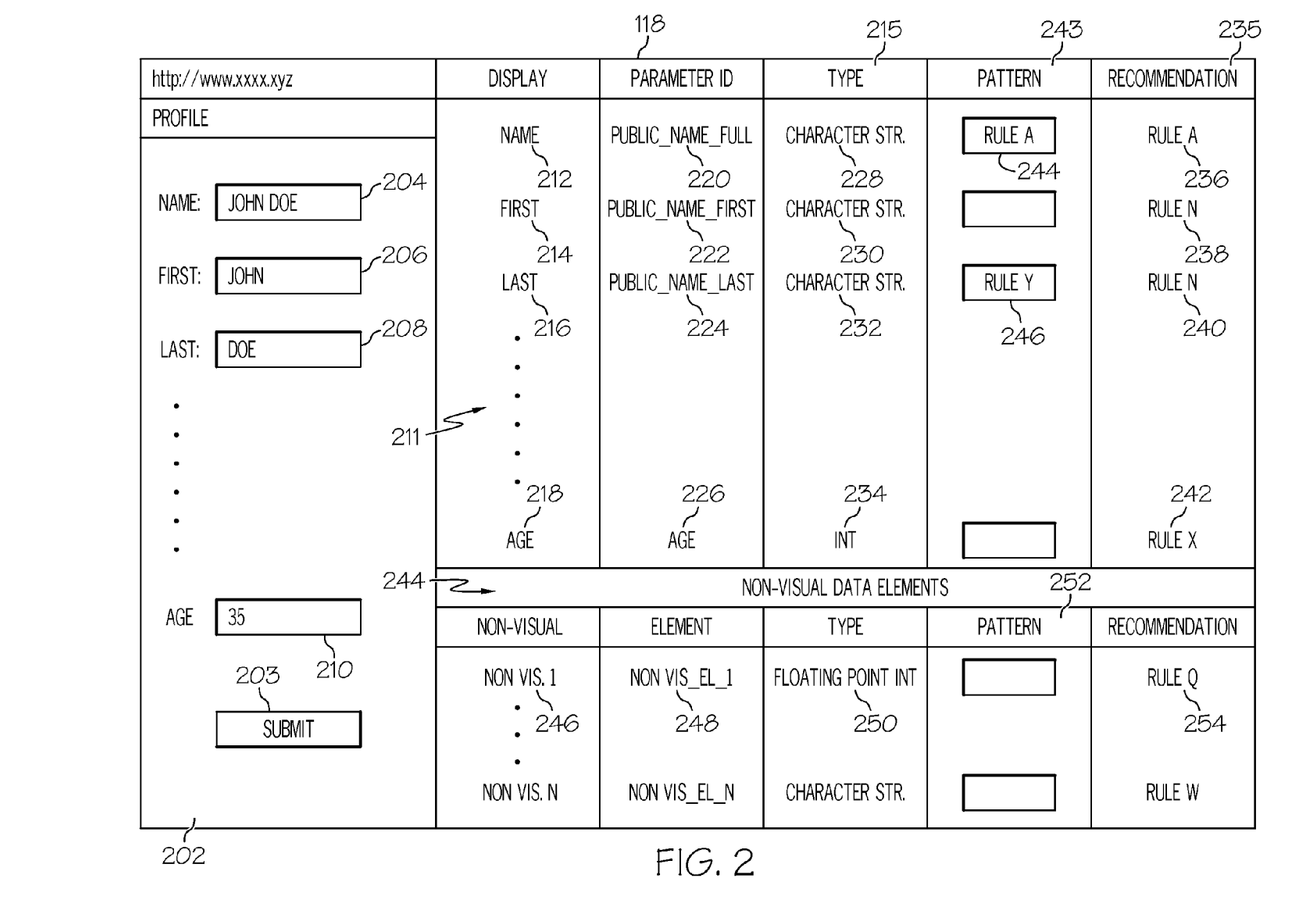
FIG. 2 shows one example of a user interface for interactively configuring WAF rules according to one embodiment of the present invention.

FIG. 2 shows one example of the UI 118 within the WAF manager 116 that a user can interact with for managing WAF rules for the WAF 114. In the example of FIG. 2, the UI 118 is displayed via the web client 112 or is part of the web client 112. In an alternative example, the UI 118 is separate from the web client 112. The WAF manager 116, via the UI 118, allows the user to interact with a web application 110 to more accurately and efficiently configure the WAF rules for the web application components.

For example, FIG. 2 shows the UI 118 displaying one or more web pages 202 of a web application 110. The web page 202 shown in FIG. 2 is a profile web page for a web application, such as a social network community, where a user enters personal data to create/update his/her profile. This data is submitted to the web application server 108 when the user selects a widget such as a "submit" button 203. It should be noted that the various embodiments of the present invention are not limited to this example of a web page/web application. The user can point the web client 112 to the web page 202 of the web application 110, which is then displayed to the user in the UI 118, or the user can point the UI 118 directly to the web page 202 of the web application 110.

The web application analyzer 120 analyzes the web page 202 to identify the data elements within the web page 202. The data elements can be either visual and/or non-visual data elements. In one embodiment, the web application analyzer 120 analyzes/parses the content generated at the web page 202 that is to be sent to the web application server 108. For example, the web application analyzer 120 can analyze the source code of the web page 202 or the Document Object Model (DOM) and identify the content that is generated, and thus the data elements, based on the source code or DOM. Alternatively, the web application analyzer 120 can monitor an output stream generated by the web page 202 that is sent to the web application server 108 and identify the data elements within the output stream. The content generated by the web page 202 can be, but is not limited to, structured content. This structured content can comprise data values/information that is to be transmitted to the web application server 108. The data values/information can represent, but are not limited to representing, visual data fields in the web application 110.

Data elements, in one embodiment, are the components of the web page 202 that hold values/information that are sent to the web application server 108 from the web client 112. For example, FIG. 2 shows a plurality of input fields 204, 206, 208, 210. These input fields 204, 206, 208, 210 are the data elements for the web page 202. The web application analyzer 120 identifies each of these input fields 204, 206, 208, 210 as the data elements via the source code or DOM of the web page 202. For example, based on the code or DOM, the web application analyzer 120 identifies that the web page 202 comprises the plurality of input fields 204, 206, 208, 210 and that data from these input fields is transmitted to the web application server 108. Alternatively, the web application analyzer 120 can monitor the web page 202 for the output stream and identify the data within the output stream that is being transmitted to the web application server 108. Based on this analysis, the web application analyzer 120 identifies that the web page comprises input fields 204, 206, 208, 210 and the data associated with each of these fields.

The web application analyzer 120 also determines the identifiers of each data element. In other words, the web application analyzer 120 identifies the descriptive identifier or displayed identifier (i.e., the name of the field as displayed on the web page 202) of each data element. For example, the web application determines that there is a "Name" input field 204, a "First" input field 206, a "Last" input field 208, and an "Age" input field 210. This information can also be obtained from the source code, DOM, or output stream of the web page.

The display module 128 displays the identified data elements, which are the input fields 204, 206, 208, 210 in the example of FIG. 2, to the user in the UI 118. The display module 128 can display the identified data elements in a dynamically generated area of the UI 118 such as in a pop-up window or in a predefined WAF rule configuration area 211 of the UI 118 as shown in FIG. 2. In one embodiment, the display module 128 presents the descriptive identifier of the identified data elements such as "Name" 212, "First" 214, "Last" 216, and "Age" 218.

In addition to determining the descriptive/displayed name of the identified data elements, the web application analyzer 120 can also identify a parameter name/identifier associated with each of the data elements. The parameter name/identifier, in one embodiment, is the actual parameter/element name of the data element within the source code. It should be noted that the parameter name/identifier can be obtained first then the descriptive/displayed name or vice versa. In another embodiment, the parameter name/identifier is an identifier sent to the web application server 108 to identify the value/information. For example, the "Name" input field data element 204 is associated with a parameter name/identifier "public_full_name" 220. This parameter name/identifier is transmitted along with the value/information for the "Name" input field data element 204 to the web application server 108 to identify the value/information. The web application analyzer 120 can obtain the parameter name/identifier for each data element by analyzing/parsing/monitoring the source code associated with the web page 202 and/or by monitoring the output stream of the web page 202.

The display module 128 displays the identified parameter name/identifier associated with each identified data element to the user in the UI 118. The display module 128 can display the parameter names/identifiers in a dynamically generated area of the UI 118 such as in a pop-up window or in the WAF rule configuration area 211 of the UI 118 as shown in FIG. 2. For example, FIG. 2 shows that the "Name" input field data element 204 is associated with a parameter name/identifier of "public_full_name" 220; the "First" input field data element 206 is associated with a parameter name/identifier of "public_name_first" 222; the "Last" input field data element 208 is associated with a parameter name/identifier of "public_name_last" 224; and the "Age" input field 210 is associated with a parameter name/identifier of "age" 226. Displaying the parameter name/identifier in the UI 118 provides the user with additional details associated with identified data elements to help with configuring the firewall rules.

The data element analyzer 122, in one embodiment, analyzes each of the identified data elements such as the input fields 204, 206, 208, 210 to determine a data type that the data element annotator 126 can associate with each of the identified data elements (e.g., the input fields 204, 206, 208, 210 in this example). Examples of data types are integers, alphanumeric strings, floating-point numbers, or any other set of data/values with a given set of characteristics. For example, the data element analyzer 122 analyzes each of the input fields 204, 206, 208, 210 and determines that the "Name" input field 204 is of a character string data type; the "First" input field 206 is of a character string data type; the "Last" input field 208 is of a character string data type; and the "Age" input field 210 is of an integer data type. The data element annotator 126 then associates each of these data elements with their respective data type. The data element analyzer 122 can also determine a data sub-type for each of the determined data types. For example, for the "Name" input field 204 the data element analyzer 122 determines that the character data type is of a "name" or an "identifier" data sub-type. It should be noted that the user can also manually associate a data type with one or more of the identified data elements. For example, the user can directly enter a data type in a data type section 215 of the WAF rule configuration area 211 for each of the data elements, select a data type from a list of data types presented to the user, and the like.

The data element analyzer 122, in one embodiment, can determine the data type to associate with each of the identified data elements by analyzing/parsing/monitoring the source code associated with the web page 202 and/or by analyzing/parsing/monitoring the output stream of the web page 202. Alternatively, the data element analyzer 122 can access an optional data type repository 132 comprising data type information 134 such as data elements and associated data types to determine which data type and/or data sub-type to associate with a data element.

In this example, a user can manually associate data types with identified data elements as discussed above. The WAF manager 116 monitors this process and stores information regarding this association in the data type information repository 132. For example, the WAF manager 116 can store information that states a character data type was associated with a data element that accepts a name as an input value. Also, this repository 132 can be manually populated by other users/administrators.

In the embodiment where the data element analyzer 122 analyzes/parses the source code associated with the web page 202, the data element analyzer 122 can infer the data type associated with each data element from the source code itself. For example, the data element analyzer 122 can analyze the source code to determine the type of data accepted by each data element. Similarly, the data element analyzer 122 can analyze/parse the output stream to infer the data type associated with each data element. For example, the data element analyzer 122 can identify the data such as a name or an age associated with each data element that is being sent to the web server. The data element analyzer 122 can then analyze this data to determine the data type that the data element annotator 126 associates with the corresponding data element. If the optional repository 132 is being used, the data element analyzer 122 can then update this repository 132 to include the data type information that it has determined from the source code, DOM, output stream, and the like.

Additionally, a programmer can add annotations to the web application 110 that describe the types of the data elements, such as fields, being created in the application 110. The data element analyzer, when analyzing the source code, DOM, a repository associated with the source code, and/or output stream of the web page 202 of the web application 110, identifies these annotations and uses these annotations to determine the data type of one or more of the data elements. Displaying these annotations can help assist the user with specifying, updating, and/or deleting types and/or filtering rules for each field. In one embodiment, the WAF manager 116 can correlate the fields back to the source code where the annotations can be used to assist the user with specifying, updating, and/or deleting types and/or filtering rules for each field. In other words, the annotations can be displayed to a user to help the user determine which WAF rule(s) to apply to a given data element.

When the data element analyzer 122 determines the data type for a data element and/or the data element annotator 126 associates the determined data type with the corresponding data element, the display module 128 visually presents the data type information to the user. The display module 128 can also visually present any identified annotations associated with the data elements from the source code or DOM. For example, FIG. 2 shows that the display module 128 has displayed in the data type section 215 of the WAF rule configuration area 211 that the "Name" input field 204 is a "character string" 228; the "First" input field 206 is a "character string" 230; the "Last" input field 208 is a "character string" 232; and the "Age" input field 210 is an "integer" 234. However, this data type information is not required to be displayed to a user.

After the display module 128 has displayed in the user interface 118 the data type information 134, as shown in FIG. 2 the user can update/change his the data type information. For example, the user can change the data type 215 associated with the "Name" input field 204 from "character string" to "alphanumeric character string". The user can either manually type this information into the data type section 215 of the WAF rule configuration area 211, select a data type from a list displayed to the user, or the like.

In an alternative embodiment, the data element analyzer 122 is not required to automatically determine the data type of an identified data element. In this embodiment, the user can manually enter the data type for one or more of the identified data elements. For example, the user can manually enter that the "Name" input field 204 is a character string data type. In this embodiment, the data element analyzer 122 does not determine the data type for a data element that the user has manually entered the data type information.

The data types that have been associated with the identified elements are then analyzed by the firewall rule generator 130 to automatically generate WAF rule recommendations 236, 238, 240, 242 for the user. In one embodiment, the firewall rule generator 130 identifies the data type associated with each of the identified data elements and analyzes the WAF rule repository 136 of WAF rules 138. The WAF rule repository 136 comprises a plurality of WAF rules 138 and information 140 regarding data types applicable to each of the WAF rules 138. For example, the firewall rule generator 130 identifies that some previous input fields called or related to "Name" has been associated with a "character string" data type. The firewall rule generator 130 then generates a WAF rule recommendation that the current input field 204 is a "character string" data type.

In addition to the data type associated with an identified data element, the firewall rule generator 130 can also use the descriptive identifier 212 and/or the parameter/element name/identifier 220 information associated with an identified data element. For example, if the descriptive identifier or the parameter/element name/identifier information comprises "email", the firewall descriptive identifier rule generator 130 can recommend or apply existing WAF rules for email. Also, if two or more descriptive identifiers and/or parameter/element name/identifiers have similar description names, the firewall rule generator 130 can perform rule association to recommend a rule to the user for the corresponding data element. For example, the firewall rule generator 130 can determine that a rule applied to one data element with a given identifier can also be applied to another data element with a similar identifier. If the WAF rule repository 136 is used in these embodiments, the WAF rule information 140 can also include information regarding the descriptive identifier 212 and/or the parameter/element name/identifier 220 applicable to each of the WAF rules 138. For example, a WAF rule 138 can have WAF rule information 140 associated with it that states that this particular rule is applicable to data elements comprising a given data element type and a given descriptive identifier.

Once the firewall rule generator 130 has completed its analysis discussed above, the firewall rule generator 130 automatically generates WAF rule recommendations 236, 238, 240, 242 for one or more of the identified data elements. These WAF rule recommendations 236, 238, 240, 242 are then visually presented to the user via the UI 118. For example, FIG. 2 shows a recommendation section 235 of the UI 118 that displays one or more WAF rule recommendations 236, 238, 240, 242 for each of the identified data elements such as the input fields 204, 206, 208, 210. In the example of FIG. 2, the firewall rule generator 130 has recommended "Rule A" 236 for the "Name" input field data element 204; "Rule N" for the "First" input field data element 206; "Rule N" for the "Last" input field data element 208; and "Rule X" for the "Age" input field data element 210.

The firewall rule generator 130 can automatically apply these recommended rules to their corresponding data elements or the user can decide whether or not to apply the recommended rule or apply a different rule. In the embodiment where the user applies a rule to an identified data element, the UI 118 displays a Pattern or Rule section 243 to the user. The Pattern or Rule section 243 displays any rule/pattern currently assigned to an identified element and allows the user to enter/select a rule to be applied to an identified element. For example, FIG. 2 shows a non-visual data elements information section, shown as a box, into which the user has applied the recommended "Rule A" to the "Name" input field data element 204. FIG. 2 also shows that a "Rule Y" 246 has already been applied to the "First" input field data element 206. However, because the UI 118 displays that the firewall rule generator 130 has recommended "Rule N" 240 for the "First" input field data element 206, the user is informed that an incorrect rule has been applied or at least that a discrepancy has occurred between the currently selected rule and the recommended rule. The user can have the WAF manager 116 automatically rectify this discrepancy by automatically applying the recommended rule or the user can manually change the rule.

It should be noted that the data elements are not always visible to the user in the web page 202. Therefore, the web application analyzer 120, in addition to the embodiments discussed above, captures the submissions from the web client 112 to the web server 106. The web application analyzer 120 then identifies non-visible data elements that are part of the submission. The processes discussed above with respect to visible data elements are applicable to these non-visible data elements for determining the parameter/element identifier, data type, pattern/rule, and pattern/rule recommendation information that is displayed to the user on the UI 118. For example, FIG. 2 shows a non-visual data element information section 244. This section 244 lists an identifier 246 of an identified non-visual data element. Parameter/element identifier 248, data type 250, pattern/rule 252, and pattern/rule recommendation 254 information is also displayed for the non-visual data elements identified, similar to that discussed above with respect to visual data elements.

It should be noted that after an initial specification of rules by a user, maintenance of these rules can be performed by performing a logical "diff" of the original page/rules with the new page. Various methods to update the rules can be performed and comprise, but are not limited to, checking for field renaming, field similarity, and/or extensions to a field.

Figure 3:
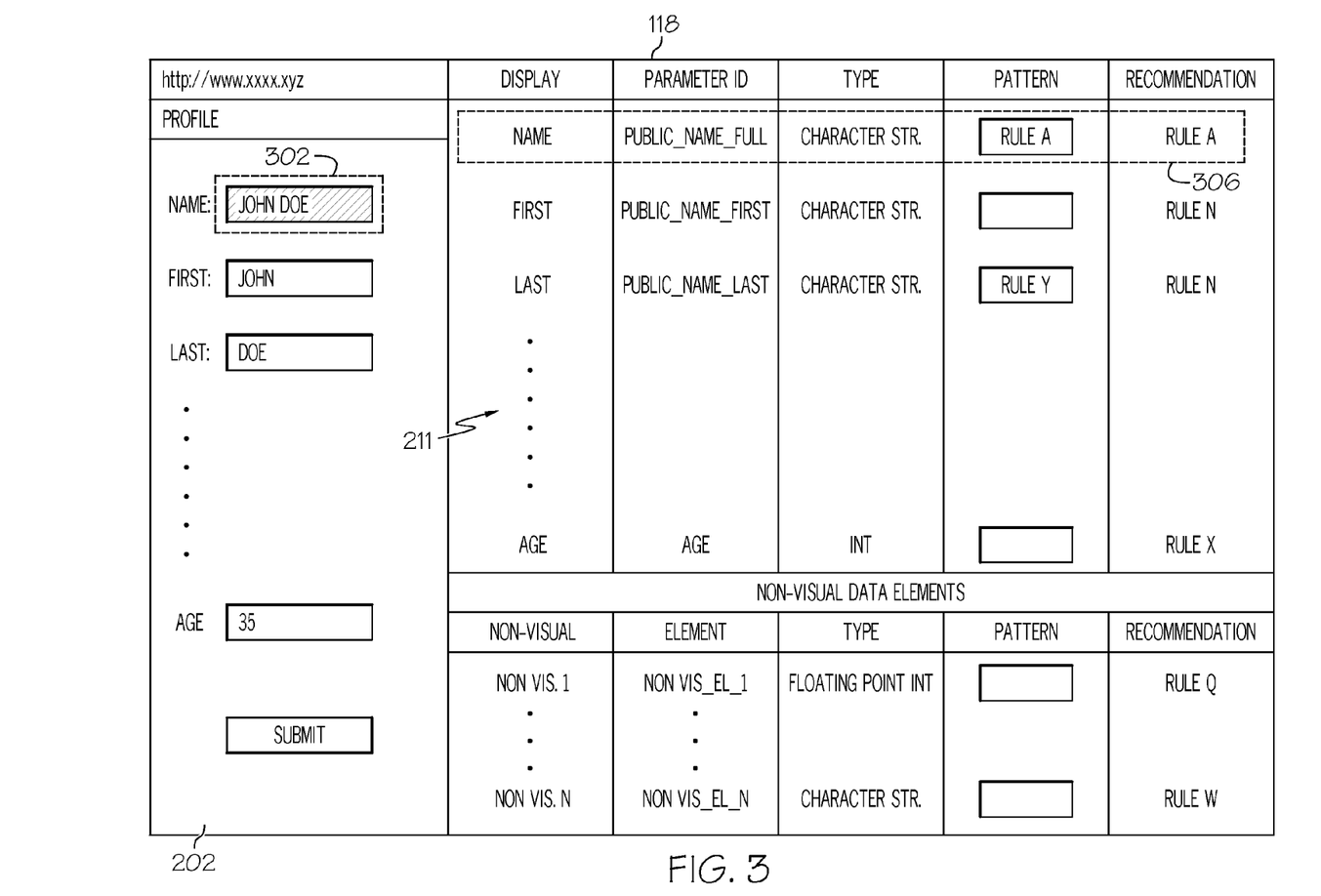
FIG. 3 shows another example of a user interface for interactively configuring WAF rules according to one embodiment of the present invention.

In one embodiment, the WAF manager 116 can display the information discussed above with respect to FIG. 2 in an interactive manner and visually correlates each selected data element in the web page 202 of the web application 110 to the information displayed in the WAF rule configuration area 211 of the UI 118. FIG. 3 shows one example of this embodiment. For example, FIG. 3 shows that a user has selected or has moved a pointer over the "Name" input field 204 in the web page 202, as indicated by a dashed box 302. The interactive monitor 124 determines that the user has selected or moved a pointer over the "Name" input field 204 and visually alters the input field, as indicated by diagonal lines 304. For example, the interactive monitor 124 can highlight the input field 204, change the font size, change the font color, or perform any other visual alteration to the input field or information within the input field.

The interaction monitor 124 then visually alters corresponding information in the WAF rule configuration area 211. For example, FIG. 3 shows that the interaction monitor 124 has visually altered the descriptive identifier 212, parameter/element name/identifier 220, data type 228, pattern/rule 244, and pattern/rule recommendation 236 information, as indicated by the dashed box 306. The interaction monitor 124 is not required to visually alter all of this information, and one or more of the descriptive identifier 212, parameter/element name/identifier 220, data type 228, pattern/rule 244, and pattern/rule recommendation information 236 may not be highlighted. This visual altering process is advantageous because it allows the user to easily identify the WAF rule configuration information (e.g., the descriptive identifier, parameter/element name/identifier, data type, pattern/rule, and pattern/rule recommendation information) associated with a given data element.

The WAF rule configuration information is not required to be displayed for every data element at the same time. For example, when the user selects moves a pointer over a data element, the corresponding WAF rule configuration information can be dynamically displayed to the user for that given data element. This information can be displayed in a pop-up window or in the WAF rule configuration area 211 of the UI 118.

Operational Flow

Figure 4:
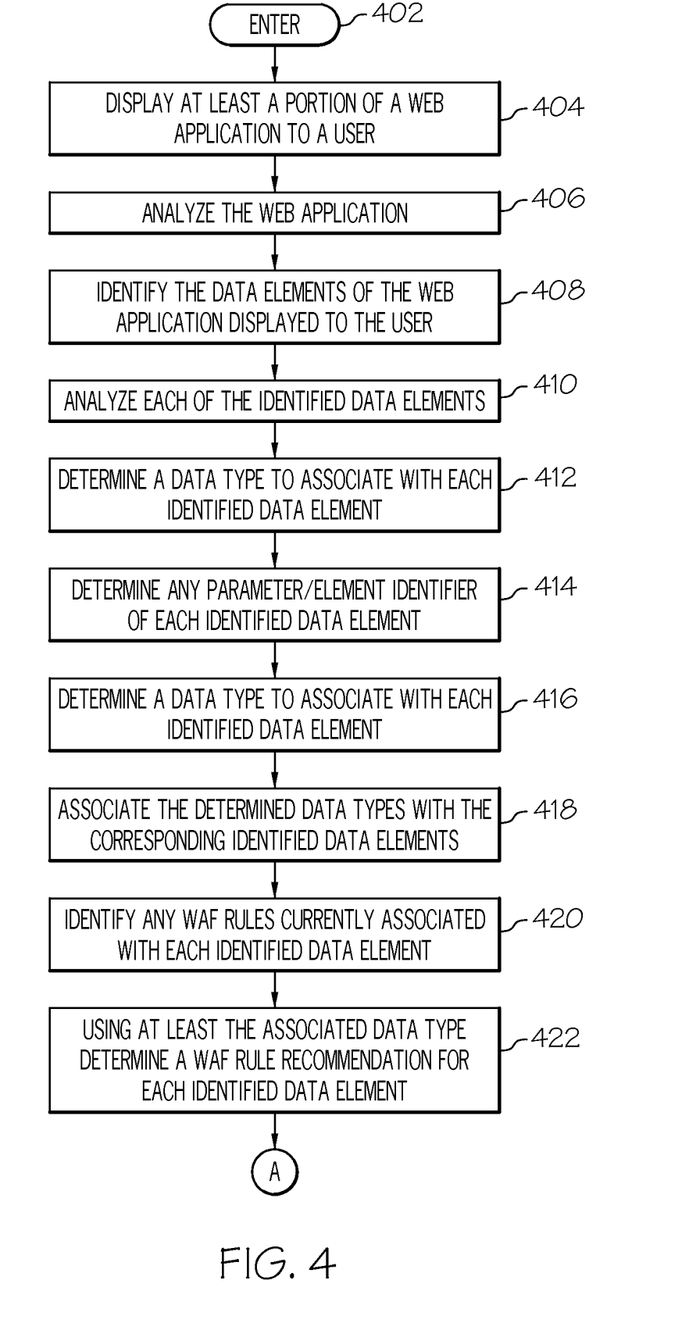
FIGS. 4-5 are operational flow diagrams illustrating one example of interactively managing the configuration of WAF rules according to one embodiment of the present invention.
Figure 5:
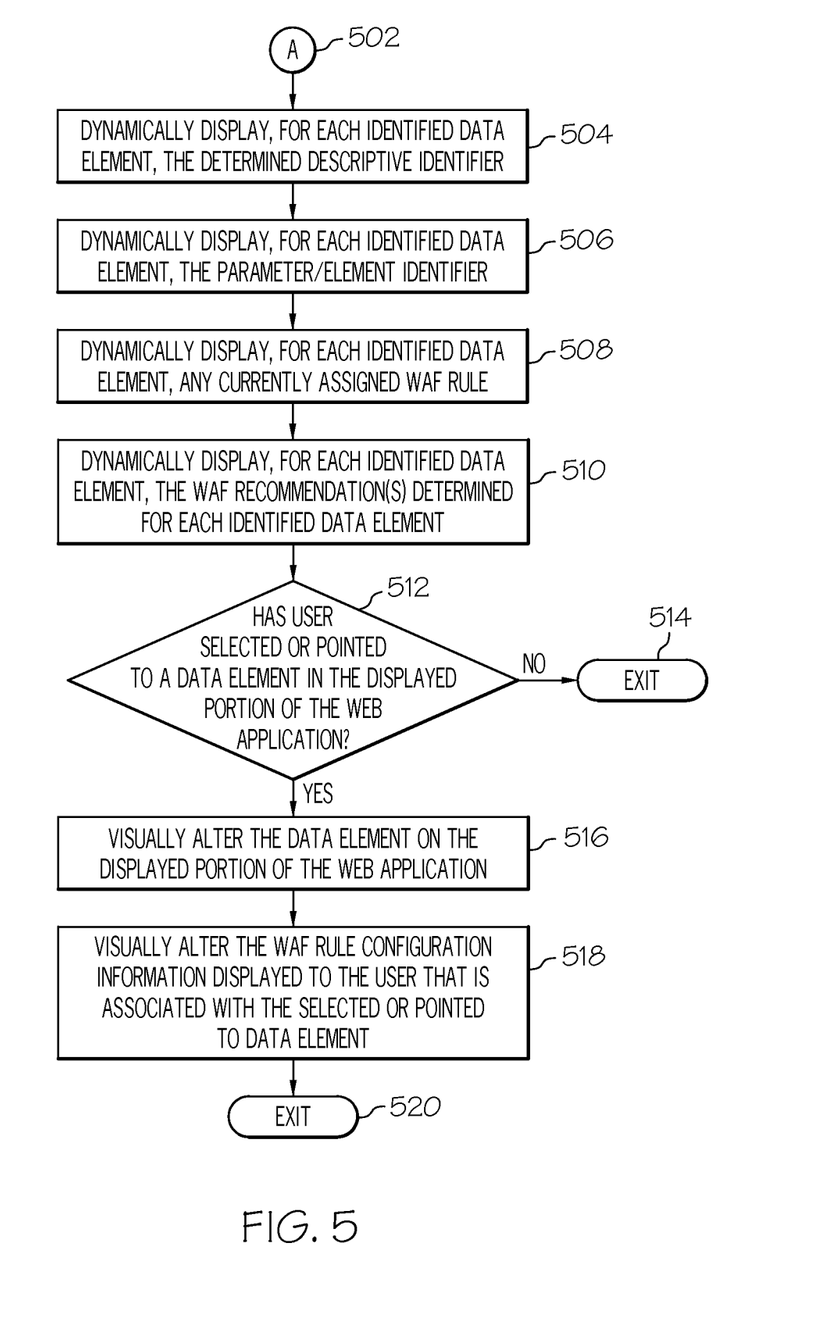

FIGS. 4 and 5 illustrate one example of interactive management of WAF rules. The steps of FIGS. 4 and 5 have been discussed in greater detail above with respect to FIGS. 2-3. The operational flow diagram of FIG. 4 begins at step 402 and flows directly to step 404. The WAF manager 116, at step 404, displays at least a portion 202 of a web application 110 to a user in a UI 118. The WAF manager 116, at step 406, analyzes the web application 110. The WAF manager 116, at step 408, identifies the data elements of the web application 110. The WAF manager 116, at step 410, analyzes each of the identified data elements. The WAF manager 116, at step 412, determines any descriptive identifiers 212 of each identified data element.

The WAF manager 116, at step 414, determines any parameter/element identifier of each identified data element.

The WAF manager 116, at step 416, determines a data type 215 to associate with each identified data element. The WAF manager 116, at step 418, associates the determined data types with the corresponding identified data elements. The WAF manager 116, at step 420, identifies any WAF rule currently associated with each identified data element. The WAF manager 116, at step 422, determines, using at least the associated data type, one or more WAF rule recommendations for each identified data element. The control then flows to entry point A 502 of FIG. 5.

The WAF manager 116, at step 504, dynamically displays in the UI 118 any identified descriptive identifier 212 for each identified data element. The WAF manager 116, at step 506, dynamically displays in the UI 118 any identified parameter/element identifier 228 for each identified data element. The WAF manager 116, at step 508, dynamically displays in the UI 118 any currently assigned WAF rule that was identified for each identified data element. The WAF manager 116, at step 510, dynamically displays in the UI 118 the WAF rule recommendation(s) 235 determined for each identified data element. The WAF manager 116, at step 512, determines if the user has selected a data element in the web page 202 of the web application 110 displayed in the UI 118. If the result of this determination is negative the control flow exits at step 514. If the result of this determination is positive, the WAF manager 116, at step 516, visually alters the data element selected, or pointed to, by the user on the displayed web page 202 of the web application 110. The WAF manager 116, at step 518, also visually alters the WAF rule configuration information (e.g., the descriptive identifier, parameter/element identifier, data type, pattern/rule, and pattern/rule recommendation information) displayed to the user that is associated with the selected or pointed to data element. The control flow then exits at step 520.

Information Processing System

Figure 6:
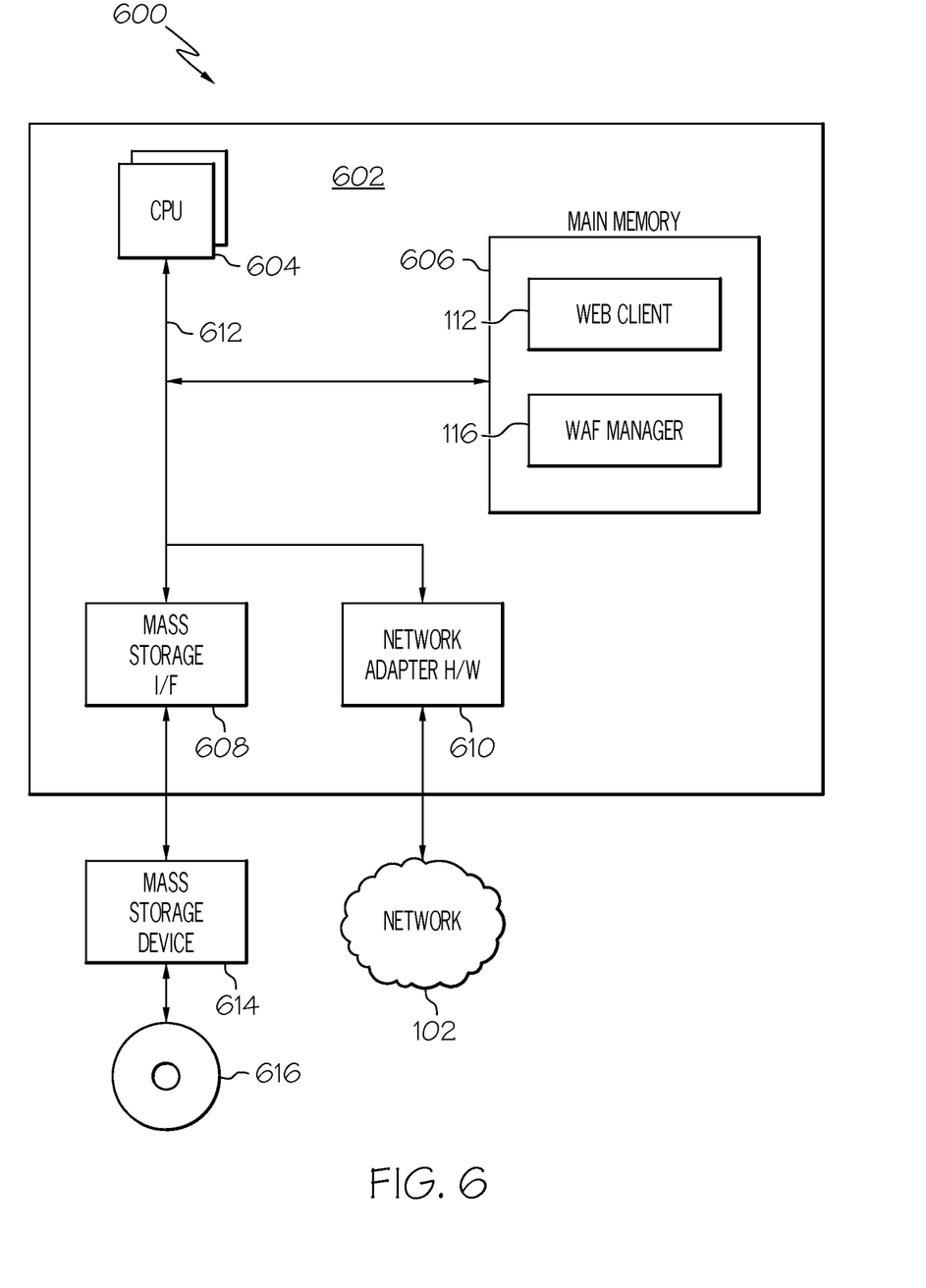
FIG. 6 is a block diagram illustrating a detailed view of an information processing system according to one embodiment of the present invention.

FIG. 6 is a block diagram illustrating detailed view an information processing system 600 according to one embodiment of the present invention. The information processing system 600, in one embodiment, is the client information processing system 104. The information processing system 600 is based upon a suitably configured processing system adapted to implement one or more embodiments of the present invention. Any suitably configured processing system is similarly able to be used as the information processing system 600 by embodiments of the present invention.

The information processing system 600 includes a computer 602. The computer 602 has a processor(s) 604 that is connected to a main memory 606, mass storage interface 608, and network adapter hardware 610. A system bus 612 interconnects these system components. The mass storage interface 608 is used to connect mass storage devices, such as data storage device 614, to the information processing system 600. One specific type of data storage device is an optical drive such as a CD/DVD drive, which may be used to store data to and read data from a computer readable medium or storage product such as (but not limited to) a CD/DVD 616. Another type of data storage device is a data storage device configured to support, for example, NTFS type file system operations.

The main memory 606, in one embodiment, comprises the web client 112, the WAF manager 116, and the WAF manager components discussed above. Although illustrated as concurrently resident in the main memory 606, it is clear that respective components of the main memory 606 are not required to be completely resident in the main memory 606 at all times or even at the same time. In one embodiment, the information processing system 600 utilizes conventional virtual addressing mechanisms to allow programs to behave as if they have access to a large, single storage entity, referred to herein as a computer system memory, instead of access to multiple, smaller storage entities such as the main memory 606 and data storage device 616. Note that the term "computer system memory" is used herein to generically refer to the entire virtual memory of the information processing system 600.

Although only one CPU 604 is illustrated for computer 602, computer systems with multiple CPUs can be used equally effectively. Various embodiments of the present invention further incorporate interfaces that each includes separate, fully programmed microprocessors that are used to off-load processing from the CPU 404. An operating system (not shown) included in the main memory is a suitable multitasking operating system such as the Linux, UNIX, Windows XP, and Windows Server 2003 operating system. Various embodiments of the present invention are able to use any other suitable operating system. Some embodiments of the present invention utilize architectures, such as an object oriented framework mechanism, that allow instructions of the components of operating system (not shown) to be executed on any processor located within the information processing system 600. The network adapter hardware 610 is used to provide an interface to one or more networks 102. Various embodiments of the present invention are able to be adapted to work with any data communications connections including present day analog and/or digital techniques or via a future networking mechanism.

Although various example embodiments of the present invention have been discussed in the context of a fully functional computer system, those of ordinary skill in the art will appreciate that various embodiments are capable of being distributed as a program product via CD or DVD, e.g., CD 616, CD ROM, or other form of recordable media, or via any type of electronic transmission mechanism.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

Although various example embodiments of the present invention have been discussed in the context of a fully functional computer system, those of ordinary skill in the art will appreciate that various embodiments are capable of being distributed as a program product via CD or DVD, e.g. CD 116, CD ROM, or other form of recordable media, or via any type of electronic transmission mechanism.

What is claimed is:

1. A graphical user interface for an information processing system managing web application firewall rule configuration, the information processing system comprising a processor communicatively coupled to the graphical user interface, the processor, responsive to executing computer instructions, performing the following method:

analyzing a web application by analyzing Open Systems Interconnection layer 7 messages between a web client and a web server;

identifying, based on the analyzing, a set of web page data elements within the web application, wherein each web page data element in the set of web page data elements includes information that is sent from the web client to the web server;

analyzing, based on the identifying, each web page data element in the set of web page data elements to determine a data type of each web page data element, wherein the data type describes a type of data in the each web page data element;

associating, based on the analyzing, a data type with each web page data element in the set of web page data elements;

automatically generating, for the at least one web page data element, based at least on the data type associated therewith, a web application firewall rule recommendation; and the graphical user interface comprising:

at least a first area that displays at least a portion of the web application; and at least a second area that interactively displays information associated with the web application for managing, by analyzing web application content of the web application by analyzing Open Systems Interconnection layer 7 messages between a web client and a web server, a set of web application firewall rules for the web application, wherein the second area displays at least a data type for each web page data element in a set of web page data elements of the web application including non-visual web page data elements of the web application, the first area dynamically alters a visual appearance of a web page data element of the web application that is displayed in the first area when the web page data element is selected by a user, and the second area dynamically alters a visual appearance of at least the data type displayed therein that is associated with the web page data element that has been selected by the user.

2. The graphical user interface of claim 1, wherein the second area displays an automatically generated web application firewall rule recommendation for at least one web page data element of the web application, and wherein the second area dynamically alters a visual appearance of the automatically generated web application firewall rule recommendation that is associated with the web page data element selected by the user.

3. A computer implemented method for managing web application firewall rule configuration, the computer implemented method comprising:

analyzing, with a processor coupled to a memory, a web application by analyzing Open Systems Interconnection layer 7 messages between a web client and a web server;

identifying, with the processor and based on the analyzing, a set of web page data elements within the web application, wherein each web page data element in the set of web page data elements includes information that is sent from the web client to the web server;

analyzing, based on the identifying, each web page data element in the set of web page data elements to determine a data type of each web page data element, wherein the data type describes a type of data in the each web page data element;

associating, with the processor and based on the analyzing, a data type with each web page data element in the set of web page data elements;

automatically generating, for the at least one web page data element, based at least on the data type associated therewith, a web application firewall rule recommendation; and in at least a first area of a graphical user interface displaying at least a portion of the web application; and in at least a second area of the graphical user interface interactively displaying information associated with the web application for managing, by analyzing web application content of the web application by analyzing Open Systems Interconnection layer 7 messages between a web client and a web server, a set of web application firewall rules for the web application, wherein in the second area displaying at least a data type for each web page data element in a set of web page data elements of the web application including non-visual web page data elements of the web application, in the first area dynamically altering a visual appearance of a web page data element of the web application that is displayed in the first area when the web page data element is selected by a user, and in the second area dynamically altering a visual appearance of at least the data type displayed therein that is associated with the web page data element that has been selected by the user.

4. The computer implemented method of claim 3, wherein in the second area displaying an automatically generated web application firewall rule recommendation for at least one web page data element of the web application, and wherein in the second area dynamically altering a visual appearance of the automatically generated web application firewall rule recommendation that is associated with the web page data element selected by the user.

5. An information processing system for managing web application firewall rule configuration, the information processing system comprising:

a memory;

a processor communicatively coupled to the memory;

a graphical user interface communicatively coupled to the memory and the processor, the processor, responsive to executing computer instructions, performing the following method:

analyzing a web application by analyzing Open Systems Interconnection layer 7 messages between a web client and a web server;

identifying, based on the analyzing, a set of web page data elements within the web application, wherein each web page data element in the set of web page data elements includes information that is sent from the web client to the web server;

analyzing, based on the identifying, each web page data element in the set of web page data elements to determine a data type of each web page data element, wherein the data type describes a type of data in the each web page data element;

associating, based on the analyzing, a data type with each web page data element in the set of web page data elements;

in at least a first area of the graphical user interface displaying at least a portion of the web application; and in at least a second area of the graphical user interface interactively displaying information associated with the web application for managing, by analyzing web application content of the web application by analyzing Open Systems Interconnection layer 7 messages between a web client and a web server, a set of web application firewall rules for the web application, wherein in the second area displaying at least a data type for each web page data element in a set of web page data elements of the web application including non-visual web page data elements of the web application, in the first area dynamically altering a visual appearance of a web page data element of the web application that is displayed in the first area when the web page data element is selected by a user, and in the second area dynamically altering a visual appearance of at least the data type displayed therein that is associated with the web page data element that has been selected by the user.

6. The information processing system of claim 5, wherein the processor, responsive to executing computer instructions, performing the following method:

in the second area displaying an automatically generated web application firewall rule recommendation for at least one web page data element of the web application, and wherein in the second area dynamically altering a visual appearance of the automatically generated web application firewall rule recommendation that is associated with the web page data element selected by the user.

7. A non-transitory computer program product for managing web application firewall rule configuration, the non-transitory computer program product comprising a computer readable storage medium having computer readable program code embodied therewith, the computer readable program code including computer instructions, where a processor, responsive to executing the computer instructions, performs operations comprising:

analyzing, with a processor coupled to a memory, a web application by analyzing Open Systems Interconnection layer 7 messages between a web client and a web server;

identifying, with the processor and based on the analyzing, a set of web page data elements within the web application, wherein each web page data element in the set of web page data elements includes information that is sent from the web client to the web server;

analyzing, based on the identifying, each web page data element in the set of web page data elements to determine a data type of each web page data element, wherein the data type describes a type of data in the each web page data element;

associating, with the processor and based on the analyzing, a data type with each web page data element in the set of web page data elements; and in at least a first area of a graphical user interface displaying at least a portion of the web application; and in at least a second area of the graphical user interface interactively displaying information associated with the web application for managing, by analyzing web application content of the web application by analyzing Open Systems Interconnection layer 7 messages between a web client and a web server, a set of web application firewall rules for the web application, wherein in the second area displaying at least a data type for each web page data element in a set of web page data elements of the web application including non-visual web page data elements of the web application, in the first area dynamically altering a visual appearance of a web page data element of the web application that is displayed in the first area when the web page data element is selected by a user, and in the second area dynamically altering a visual appearance of at least the data type displayed therein that is associated with the web page data element that has been selected by the user.

8. The computer program product of claim 7, wherein the computer readable program code including computer instructions, where the processor, responsive to executing the computer instructions, performs operations comprising:

in the second area displaying an automatically generated web application firewall rule recommendation for at least one web page data element of the web application, and wherein in the second area dynamically altering a visual appearance of the automatically generated web application firewall rule recommendation that is associated with the web page data element selected by the user.

\* \* \* \* \*